United States Patent [19]
Richley

[11] Patent Number: 5,976,428
[45] Date of Patent: Nov. 2, 1999

[54] METHOD AND APPARATUS FOR CONTROLLING FORMATION OF TWO-COLOR BALLS FOR A TWISTING BALL DISPLAY

[75] Inventor: Edward A. Richley, Palo Alto, Calif.

[73] Assignee: Xerox Corporation, Stamford, Conn.

[21] Appl. No.: 09/004,959

[22] Filed: Jan. 9, 1998

[51] Int. Cl.$^6$ .................................................... B29B 9/10
[52] U.S. Cl. ................................... 264/10; 264/5; 264/8; 425/6; 425/8
[58] Field of Search .............................. 264/5, 8, 9, 10, 264/12, 13; 425/6, 8

[56] References Cited

U.S. PATENT DOCUMENTS

| | | |
|---|---|---|
| Re. 29,742 | 8/1978 | Tung . |
| 745,276 | 11/1903 | Cooley ........................................ 264/10 |
| 2,326,634 | 8/1943 | Gebhard et al. . |
| 2,354,018 | 7/1944 | Heltzer et al. . |
| 2,354,048 | 7/1944 | Palmquist . |
| 2,354,049 | 7/1944 | Palmquist . |
| 2,407,680 | 9/1946 | Palmquist et al. . |
| 2,600,963 | 6/1952 | Bland . |
| 2,684,788 | 7/1954 | Bland . |
| 2,794,301 | 6/1957 | Law et al. . |
| 2,950,985 | 8/1960 | Duval d'Adrian . |
| 2,965,921 | 12/1960 | Bland . |
| 2,980,547 | 4/1961 | Duval d'Adrian . |
| 3,150,947 | 9/1964 | Bland . |
| 3,222,204 | 12/1965 | Weber et al. . |
| 3,243,273 | 3/1966 | Bland . |
| 3,310,391 | 3/1967 | Law . |
| 3,617,333 | 11/1971 | Brown . |
| 3,648,281 | 3/1972 | Dahms et al. . |
| 3,795,435 | 3/1974 | Schwab . |
| 3,915,771 | 10/1975 | Gatzke et al. . |
| 4,002,022 | 1/1977 | Lopez . |
| 4,082,426 | 4/1978 | Brown . |
| 4,117,192 | 9/1978 | Jorgensen . |
| 4,117,194 | 9/1978 | Barbe et al. . |
| 4,126,854 | 11/1978 | Sheridon . |

(List continued on next page.)

FOREIGN PATENT DOCUMENTS

| | | |
|---|---|---|
| 2 161 301 | 7/1973 | France . |
| 40 08 825 A1 | 3/1991 | Germany . |
| 196 53 507 | 6/1998 | Germany . |
| 53-57998 | 5/1978 | Japan . |
| 3-62827 | 3/1991 | Japan ....................................... 264/10 |

OTHER PUBLICATIONS

Berchtold: ChromoVision Surgical Camera System Sales Brochure.

*Business Wire* (available through Dialog, File 610), "S.I.P. and ETIP to jointly develop the world's first eraseable and reusable paper for printing." Aug. 19, 1991.

*IEEE Grid*, Jan. 1996, pp. 17–20 (includes article entitled "Electric Paper: A Rearch Odyssey" and corresponding calendar listing at p. 19).

*Primary Examiner*—Mathieu D. Vargot
*Attorney, Agent, or Firm*—Fay, Sharpe, Beall, Fagan, Minnich & Mckee, LLP

[57] ABSTRACT

An apparatus for fabricating bichromal balls includes a means for fabricating droplets from electrically conductive hardenable liquids. The liquids have different colors. A forward end of the hardenable liquids becomes unstable and breaks up into the droplets. Each droplet includes hemispheres of different colors. An RF signal generator produces electrical pulses which increase the instability of the forward end of the hardenable liquids. A capacitance in the conductive liquids causes current to flow from the signal generator to the hardenable liquids. A diameter of the droplets is reduced to form substantially spherical balls. Each of the balls includes hemispheres of different colors. The bichromal balls are collected.

19 Claims, 3 Drawing Sheets

U.S. PATENT DOCUMENTS

| | | |
|---|---|---|
| 4,143,103 | 3/1979 | Sheridon . |
| 4,229,732 | 10/1980 | Hartstein et al. . |
| 4,256,677 | 3/1981 | Lee . |
| 4,261,653 | 4/1981 | Goodrich . |
| 4,264,641 | 4/1981 | Mahoney et al. ............... 264/10 |
| 4,267,946 | 5/1981 | Thatcher . |
| 4,268,413 | 5/1981 | Dabisch . |
| 4,288,788 | 9/1981 | Rogers et al. . |
| 4,299,880 | 11/1981 | Arens . |
| 4,367,920 | 1/1983 | Tung et al. . |
| 4,374,889 | 2/1983 | Arens . |
| 4,381,616 | 5/1983 | Saxer . |
| 4,418,098 | 11/1983 | Maistrovich . |
| 4,438,160 | 3/1984 | Ishikawa et al. . |
| 4,441,791 | 4/1984 | Hornbeck . |
| 4,492,435 | 1/1985 | Banton et al. . |
| 4,500,172 | 2/1985 | Gagnon et al. . |
| 4,511,210 | 4/1985 | Tung et al. . |
| 4,569,857 | 2/1986 | Tung et al. . |
| 4,592,628 | 6/1986 | Altman et al. . |
| 4,599,294 | 7/1986 | Matsumoto et al. ............... 264/10 |
| 4,613,076 | 9/1986 | Dietz et al. ............... 264/8 |
| 4,678,695 | 7/1987 | Tung et al. . |
| 4,688,900 | 8/1987 | Doane et al. . |
| 4,695,528 | 9/1987 | Dabisch et al. . |
| 4,710,732 | 12/1987 | Hornbeck . |
| 4,713,295 | 12/1987 | LaRoche . |
| 4,721,649 | 1/1988 | Belisle et al. . |
| 4,725,494 | 2/1988 | Belisle et al. . |
| 4,729,687 | 3/1988 | Arens . |
| 4,774,037 | 9/1988 | Hendricks ............... 264/10 |
| 4,810,431 | 3/1989 | Leidner . |
| 4,837,071 | 6/1989 | Tagoku et al. . |
| 4,877,253 | 10/1989 | Arens . |
| 4,890,902 | 1/1990 | Doane et al. . |
| 4,919,521 | 4/1990 | Tada et al. . |
| 4,948,232 | 8/1990 | Lange . |
| 4,956,619 | 9/1990 | Hornbeck . |
| 4,991,941 | 2/1991 | Kalmanash . |
| 4,994,204 | 2/1991 | Doane et al. . |
| 5,039,557 | 8/1991 | White . |
| 5,075,186 | 12/1991 | Sheridon . |
| 5,128,203 | 7/1992 | LaRoche . |
| 5,155,607 | 10/1992 | Inoue et al. . |
| 5,157,011 | 10/1992 | Okabe et al. . |
| 5,189,658 | 2/1993 | Moses . |
| 5,219,820 | 6/1993 | Morohoshi et al. . |
| 5,226,099 | 7/1993 | Mignardi et al. . |
| 5,249,000 | 9/1993 | Okabe et al. . |
| 5,251,048 | 10/1993 | Doane et al. . |
| 5,262,098 | 11/1993 | Crowley et al. . |
| 5,262,374 | 11/1993 | Okabe et al. . |
| 5,274,460 | 12/1993 | Yamada et al. . |
| 5,315,418 | 5/1994 | Sprague et al. . |
| 5,315,776 | 5/1994 | Strawbridge et al. . |
| 5,331,454 | 7/1994 | Hornbeck . |
| 5,344,594 | 9/1994 | Sheridon . |
| 5,354,598 | 10/1994 | Arens . |
| 5,363,222 | 11/1994 | Ledebuhr . |
| 5,383,008 | 1/1995 | Sheridon . |
| 5,384,067 | 1/1995 | Doane et al. . |
| 5,389,426 | 2/1995 | Arens et al. . |
| 5,389,945 | 2/1995 | Sheridon . |
| 5,397,503 | 3/1995 | Yuasa et al. . |
| 5,416,996 | 5/1995 | Clemens et al. . |
| 5,432,526 | 7/1995 | Hyatt . |
| 5,432,534 | 7/1995 | Maruyama et al. . |
| 5,459,602 | 10/1995 | Sampsell . |
| 5,469,020 | 11/1995 | Herrick . |
| 5,515,075 | 5/1996 | Nakagiri et al. . |
| 5,526,016 | 6/1996 | Nakagiri et al. . |
| 5,535,047 | 7/1996 | Hornbeck . |

OTHER PUBLICATIONS

Philip Yam, "Plastics Get Wired," *Scientific American,* Jul. 1995, pp. 82–87.

*OEP* (*Office Equipment and Products*), "Thermal Film Medium from Ricoh Permits Rewriting," Dec. 1993, p. 610.

Peter Tebbutt, "Now you see it . . . now you don't," *New Scientist,* May 30, 1992, p. 17.

J.D. Mosley, "Flexible LCD is lighter and thinner than glass," *EDN,* Oct. 31, 1985, p. 93.

A. Chiang, D. Curry and M. Zarzychi, "A Stylus Writable Electrophoretic Display Device," *SID 79 Digest,* 1979, pp. 44–45.

N.K. Sheridon and M.A. Berkovitz, "The Gyricon—A Twisting Ball Display," *Proceedings of the SID,* vol. 18/3 & 4, 1977, pp. 289–293.

R. Yamaguchi and S. Sato, "Light Scattering and Reflection Properties in Polymer Dispersed Liquid Crystal Cells with Memory Effects," *IEICE Trans. Electron,* vol. E 78 C No. 1, Jan. 1995, pp. 106–110.

Lawrence L. Lee, "A Magnetic Particles Display," *IEEE Transactions on Electron Devices,* vol. ED 22, No. 9, Sep. 1975, pp. 758–765.

Richard A. Strain, "Additive color Mixture with Fluorescent Pigments and Special Illumination," *Color Research and Applications,* vol. 1, No. 3, Fall 1976, pp. 146–147.

M. Saitoh, T. Mori, R. Ishikawa and H. Tamura, "A Newly Developed Electrical Twisting Ball Display," *Proceeding of the SID,* vol. 23, No. 4, 1982, pp. 249–250.

R. Micheletto, H. Fukada and M. Ohtsu, "A Simple Method for the Production of a Two–Dimentional, Ordered Array of Small Latex Particles," *Langmuir,* vol. 11, No. 9, May 1995, pp. 3333–3336.

Deane B. Judd and Günter Wyszecki, *Color in Business, Science, and Industry* (2nd ed.), New York: John Wiley and Sons, Inc., 1967, pp. 387–405.

Wesley Wm. Wendlandt and Harry G. Hecht, *Reflectance Spectroscopy,* New York: Interscience Publishers, 1966, pp. 46–91, 253–275.

G. Chui, "A Page from the Future," San Jose Mercury News, Jun. 18, 1996, pp. 12E, 11E.

J.L. Bruneel and F. Micherson, "Optical Display Device Using Bistable Electrets," *American Institute of Physics,* vol. 30, No. 8, Apr. 15, 1977, pp. 382–383.

Robert L. Saxe and Robert I. Thompson, "Suspended–Particle Devices," *Information Display,* Nos. 4 & 5, 1996, pp. 20–23.

Lars A. Yoder, "The TI Digital Light Processing Micromirror Tech: Putting It To Work Now," *Advanced Imaging,* Jun. 1996, pp. 43–46.

PCT International Search Report, Int'l; Appl. No. US97/10123, Int'l Filing Date Jun. 25, 1997.

METHOD AND APPARATUS FOR CONTROLLING FORMATION OF TWO-COLOR BALLS FOR A TWISTING BALL DISPLAY

BACKGROUND OF THE INVENTION

The present invention relates to large-scale fabrication of small, two-color balls, approximately 12 $\mu$m in diameter, for use in an "electric paper" display sheet.

Typical electric paper displays are disclosed in U.S. Pat. Nos. 4,126,854 and 4,143,103, the subject matters of which are fully incorporated herein by reference. In general, such displays include an elastomeric host layer a few millimeters thick which is heavily loaded with hemispherically bichromal (i.e., two-color) balls. Each bichromal ball has hemispheres of contrasting colors, such as a white half and a black half. Upon application of an electrical field between electrodes located on opposite surfaces of the host layer, the balls rotate to present one or the other hemisphere to an observer, depending on the polarity of the field. The resolution of the electric paper is dependent upon the number and size of the bichromal balls loaded into the host layer. More specifically, loading a greater number of bichromal balls having smaller diameters (e.g., ≈12 $\mu$m) into the host layer produces an electric paper having a higher resolution. Therefore, it is desirable to produce large numbers of bichromal balls having such smaller diameters.

Heretofore, a typical method of creating bichromal balls has included the spinning disc method which is disclosed by Crowley et al. in U.S. Pat. No. 5,262,098, the subject matter of which is fully incorporated herein by reference.

Briefly, the spinning disc method includes introducing black and white pigmented, hardenable liquids to upper and lower surfaces, respectively, of a disc mounted on a rotatable spindle. The liquids are moved to the periphery of the disc by centrifugal force where they flow together, without mixing, to form bichromal "globs." The centrifugal force causes the bichromal globs to "break-away" from the disc, during a process referred to as "break-up."

Ideally, the globs break-away from the disc in the form of small, individual spherical balls which are substantially identical and have proper bichromal characteristics (i.e., one hemisphere contains the black pigment while the other hemisphere contains the white pigment). Although the spinning disc method is capable of producing a large number of bichromal balls in a relatively short period of time, a large percent of the balls produced are unacceptable. In other words, the balls are not substantially identical to each other (e.g., the diameter of one ball may be ≈12 $\mu$m while the diameter of another ball may be 80 $\mu$m or greater) and/or they do not have proper bichromal characteristics.

Bichromal balls are typically produced from various polymers (e.g., waxes or other resins), having pigment loadings of 25% to 50% by weight (or less than 12% by volume), heated to temperatures of approximately 500° C. to 600° C. The polymer/pigment combination is referred to as a slurry. The resulting viscosity of the molten slurry at these pigment loadings and temperatures typically ranges between about 15 centipoise and about 20 centipoise. At these viscosities, however, only about 10% of the slurry input to a spinning disc production system is output as bichromal balls having acceptable characteristics. In other words, approximately 90% of the bichromal balls produced by current methods are unacceptable.

One reason for the low yield of usable balls is "ligament snap-back." Ligament snap-back is a phenomenon which results when the balls break-away from the disc too slowly. Globs which should be dispensed from the disc are instead pulled-back in the axial direction by surface tension. These globs which have been pulled-back combine with one or more subsequent globs, thereby forming a single oversized glob and, consequently, an oversized ball. Oversized balls are frequently non-spherical and have improper bichromal surface characteristics. One way to prevent ligament snap-back is to decrease the viscosity of the polymer used to form the balls, thereby preventing the slurry from breaking-away from the disc too slowly. In this manner, the forces exerted by the viscosity of the slurry become insignificant relative to the forces exerted by surface tension.

Paraffin wax, which has a viscosity between about 5 centipoise and about 6 centipoise (i.e., lower than polymers previously used for creating the slurry), has been used for preventing ligament snap-back. However, paraffin wax has a relatively lower melting point than other polymers. Also, because of the lower viscosity, the pigments suspended within the paraffin wax tend to mix between the hemispheres during the formation of the balls. Therefore, the balls formed using paraffin wax also lack preferred bichromal characteristics.

Viscous forces are typically described in terms of "viscous length". Viscous length is defined as:

$$L_\eta = \frac{9\eta^2}{\gamma\rho} \quad (1)$$

where $\eta$ represents the viscosity, $\gamma$ represents the surface tension, and $\rho$ represents the mass density of a fluid. Most fluids have densities around $10^3$ kgM$^{-3}$, and surface tensions of about 0.03 NM$^{-1}$. These two properties are remarkably similar among many fluids. Therefore, a comparison of $L_\eta$ among various fluids is primarily a comparison of their viscosities.

Proper break-up is obtained when the respective diameters $L_D$ of the balls which break-away from the disc are much larger than $L_\eta$. Since $L_D$ represents the diameter of a ball, it is also a measure of the distance between the centers of two sequential balls which have similar diameters. A somewhat quantitative measure of the quality of break-up can be obtained by comparing the characteristic time for break-up, $\tau_b$, with the characteristic time for snap-back, $\tau_c$. The ratio of these times then indicates the degree of competition between the forces for break-up and the forces for snap-back. It can be shown that:

$$\frac{\tau_b}{\tau_c} \approx \sqrt{\frac{L_\eta}{L_D}} \quad (2)$$

Proper break-up has been shown to occur when:

$$\frac{\tau_b}{\tau_c} \ll 1 \quad (3)$$

To satisfy Equation 3, the characteristic time for break-up must be significantly shorter than the characteristic time for snap-back. In other words, one glob must break-away from the disc before enough relative inertia is imparted to subsequent balls.

For slurries including low pigment loading, such as those currently used for producing twisting balls, the viscous length, $L_\eta$, is approximately 60 $\mu$m. As stated above, balls currently produced by the spinning disc method have diameters, $L_D$, of approximately 80 μm It can be seen from Equation 2 that these values yield a ratio of break-up time to snap-back time, $\tau_b/\tau_c$, of approximately 0.866. Equation 3 indicates such conditions are not ideal for proper break-up conditions to occur. Therefore, it is evident proper break-up conditions do not occur when bichromal balls are fabricated from the slurries currently used.

To obtain even finer resolutions, it is desirable to produce bichromal balls having even smaller diameters (i.e., smaller values of $L_D$). However, Equation 2 shows that bichromal balls having a smaller diameter result in a relatively larger value for the ratio $\tau_b/\tau_c$, if the viscous length is held constant. Larger values of $\tau_b/\tau_c$ indicate a longer break-up time relative to the snap-back time. Such a result, as shown by Equation 3, is undesirable and will result in even fewer acceptable balls. Furthermore, bichromal balls having smaller diameters will require a higher percent of pigment loading in the polymer to obtain proper opacity. The increased pigment loading tends to increase the viscosity of the slurry and, hence, $L_\eta$, thus resulting in even higher values for the $\tau_b/\tau_c$ ratio.

Mechanical means which excite the ligament have been used for starting the break-up process at an earlier time. However, because the mass of devices typically used to produce the bichromal balls (e.g., spinning discs) are very large, mechanical excitation means do not lend themselves to high production rate methods. Furthermore, mechanical excitation means do not solve the problem of ligament snap-back.

The present invention provides a new and improved method for controlling formation of two-color balls for a twisting ball display, which overcome the above-referenced problems and others.

SUMMARY OF THE INVENTION

An apparatus for fabricating bichromal balls includes a spindle. A separator member is attached to the spindle through a rotatable connector. The separator member has a first surface and a second surface located opposite the first surface and an edge region in contact with both the first and second surfaces. A polymer is capable of forming a hardenable material A carrier fluid is electrically conductive. A slurry contains the polymer and the carrier fluid. The slurry is less viscous than the polymer. A first colored pigment is added to a first part of the slurry. A second colored pigment is added to a second part of the slurry. The first and second parts of the slurry flow over the first and second surfaces, respectively, toward the edge region. The first and second parts of the slurry arrive at the edge at substantially the same flow rate and form a reservoir of the parts of the slurry outboard of the edge region. The reservoir includes side-by-side regions of the first and second parts of the slurry. The first and second parts of the slurry are propelled out of a tip of the reservoir as a plurality of bichromal streams having side-by-side portions of different colors. A forward end of the streams becomes unstable and breaks up into droplets. Each droplet includes hemispheres of differently colored slurries. An RF signal generator produces electrical pulses at the tip of the reservoir. The pulses enhance the break up of the streams into the droplets by increasing the instability of the forward end of the streams. A capacitance in the streams cause current from the electrical pulses to flow from the signal generator through the tip of the reservoir and to the streams. The carrier fluid is removed from the droplets to form substantially spherical balls. Each of the balls comprises hemispheres of different colors and has a diameter less than a diameter of the droplet from which it is formed. The bichromal balls are collected.

In accordance with one aspect of the invention, the carrier fluid is an alcohol.

In accordance with another aspect of the invention, a first electrical conductor carries the pulses from the RF signal generator, through the spindle and to the rotatable connector and a second electrical conductor carries the pulses from the rotatable connector, through the separator member, and to the tip of the reservoir.

In accordance with a more limited aspect of the invention, the streams include a narrow portion behind the forward end and a wide portion behind the narrow portion, and the RF signal produces heat for boiling-away at least a part of the narrow portion.

One advantage of the present invention is that it reduces ligament snap-back during the production of the bichromal balls.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
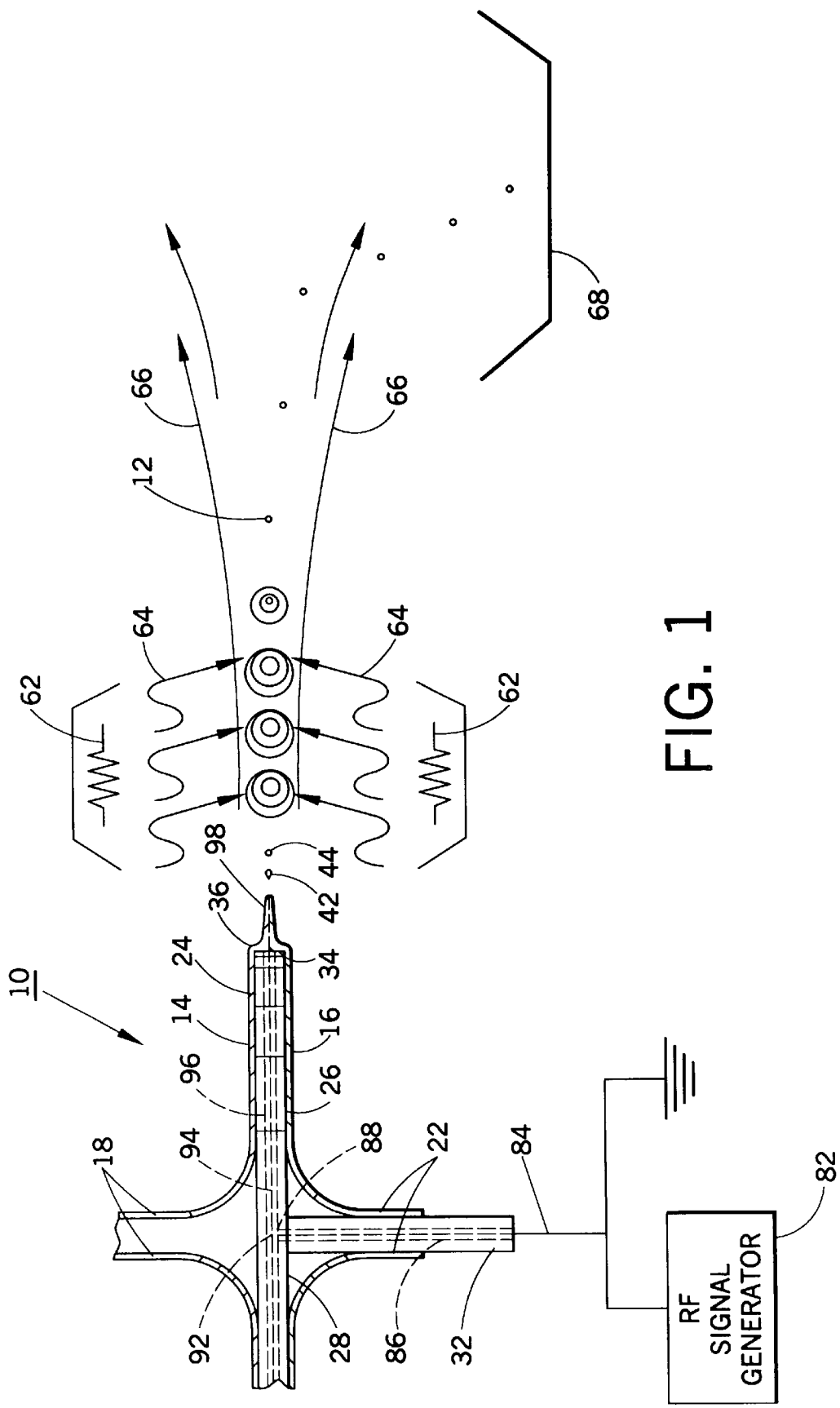
FIG. 1 is an apparatus for producing hemispherical bichromal balls for use in electric paper, twisting ball displays.

FIG. 1 illustrates an apparatus 10 for producing hemispherical bichromal balls 12 for use in electric paper, twisting ball displays. Hardenable slurries 14, 16, of two different colors, are introduced via suitable dispensing nozzles 18, 22 to upper and lower surfaces 24, 26, respectively, of a disc 28 mounted upon a rotatable spindle 32. The slurries 14, 16 are preferably of contrasting colors, such as white and black, respectively, and will be described as such. However, it is to be understood the slurries could be of any two colors. The slurries 14, 16 are moved to the periphery 34 of the disc 28, on their respective sides, under the influence of centrifugal force. At the edge of the disc 28 they flow together (but do not mix) to form a peripheral side-by-side bichromal reservoir 36 from which ligaments (see FIG. 3) extend. Distal ends of the ligaments dispense droplets 42. The droplets 42 form into a substantially spherical shape 44 soon after leaving the reservoir 36. Although it has been described to create droplets 42 using a spinning disc, it is to be understood that other methods of fabricating droplets, including the use of jets or jet sheets, are also contemplated.

Figure 2:
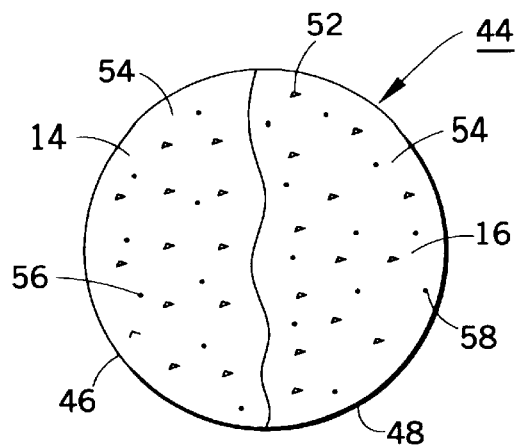
FIG. 2 illustrates an enlarged view of a spherical droplet formed from the apparatus shown in FIG. 1.

FIG. 2 illustrates an enlarged view of the spherical droplet 44 formed from the apparatus 10. The droplet 44 includes two hemispheres 46, 48 made from the differently colored slurries 14, 16, respectively. The slurries 14, 16 contain a mixture of polymer particles 52 suspended in a carrier fluid 54. The polymer particles 52 typically have a viscosity between about 15 centipoise and about 20 centipoise. Although the polymer particles 52 are preferably a wax, other resins having similar viscosities are also contemplated. The carrier fluid 54 is preferably water. However, an alcohol or any of a variety of other low-viscosity liquids are also contemplated. White and black colored pigment particles 56, 58, respectively, are added to the polymer particle/carrier fluid mixture to produce the white and black colored slurries 14, 16, respectively. In this embodiment, the pigments 56, 58 are suspended in the mixture. Other embodiments in which pigments are dissolved in the carrier fluid are also contemplated.

The resultant slurries 14, 16 are of sufficient viscosities to produce a large number of droplets 42 having proper bichromal characteristics. The diameters of the spherical droplets 44 are approximately 80 $\mu$m, much greater than that of the desired diameter of approximately 12 $\mu$m. Therefore, the spherical droplets 44 are processed to produce the bichromal balls 12, which have the desired diameters while retaining the substantially spherical shape and bichromal characteristics.

In order to reduce the size of a ball from 80 $\mu$m to the desired size of 12 $\mu$m, the carrier liquid 54 is preferably boiled-off and the polymer particles 52 are melted. However, other methods of reducing the size of the spherical ball are also contemplated Preferably, the boiling point of the carrier fluid 54 is higher than the melting point of the polymer particles 52 so that it is possible for these two processes to be performed simultaneously. In this manner, applying enough heat to boil-off the carrier fluid 54 ensures there is enough heat to melt the polymer particles 52.

Referring again to FIG. 1, heating elements 62 apply the heat 64 to the spherical droplet 44 while the droplet 44 is in flight (e.g., during the first few milliseconds after it is discharged from the spinning disc apparatus 10). A forced gas 66 carries the spherical droplet 44 past the heating elements 62 at the proper velocity. Preferably, the gas 66 is air, nitrogen, or argon, although other inert gases are also contemplated. The temperature of the spherical droplet 44 does not exceed the boiling point of the carrier fluid 54 until the fluid 54 is completely boiled-off. The diameter of the spherical droplet 44 after the fluid 54 has been boiled-off and the polymer particles 52 have been melted (i.e., the diameter of the final bichromal ball 12) is dependent upon the concentration of polymer particles 52 and pigment particles 56, 58 contained in the slurry. It should be noted that the ratio of the amount of polymer particles 52 to the amount of the pigment particles 56, 58 may be adjusted without substantially affecting the viscous length $L_\eta$ of the slurries 14, 16. Once the carrier fluid 54 has been boiled-off and the polymer particles 52 have been melted, the final bichromal ball 12 is collected in a collection apparatus 68.

The velocity of the forced gas 66 controls the amount of time the spherical droplet 44 is exposed to the heat 64. If the spherical droplet 6, travels past the heating elements 62 too slowly, excess heat may be applied after the carrier fluid 54 is boiled-off. Consequently, the polymer particles 52 and/or the pigment particles 56, 58 could be destroyed by combustion or decomposition. Conversely, if the spherical droplet 44 travels past the heating elements 62 too quickly, not enough heat is applied to the spherical droplet 44. In this situation, the carrier fluid 54 is not completely boiled-off and the polymer particles 52 are not completely melted. Consequently, the diameter of the spherical droplet 44 is not reduced to the desired size.

Figure 3:
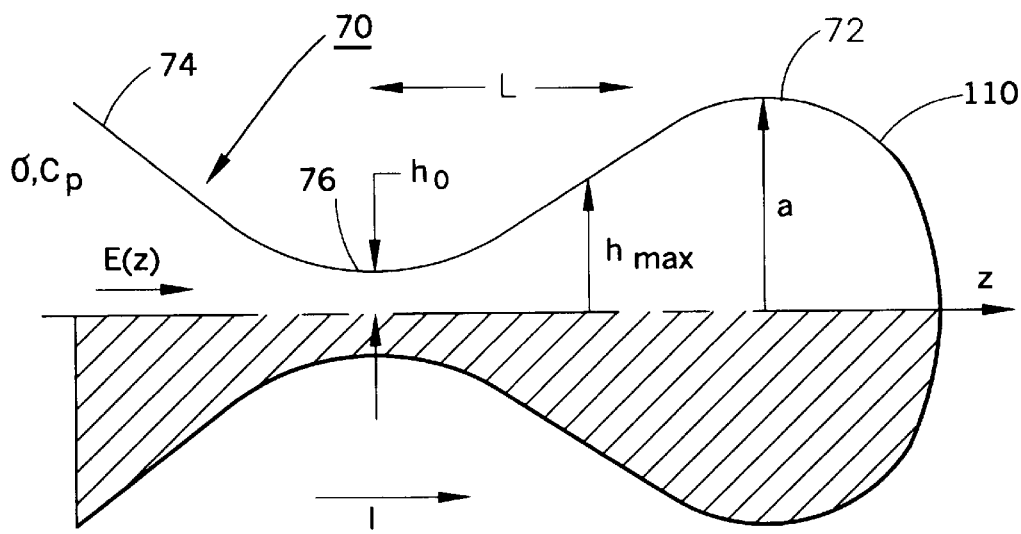
FIG. 3 illustrates an enlarged view of a ligament which is formed between two subsequent globs produced by the apparatus shown in FIG. 1.

FIG. 3 illustrates an enlarged view of the ligament 70, including first and second globs 72, 74, respectively, and a neck 76. The first and second globs 72, 74, respectively, eventually form into individual droplets 42. The neck 76 is the thin region between the globs 72, 74. It is desirable to introduce an electrical pulse which encourages the neck 76 of each ligament 70 to collapse and actually break. The ligaments 70, and consequently the necks 76, are produced at regular time intervals when the bichromal balls are formed using methods such as those described above for FIGS. 1 and 2. Therefore, the electrical pulses are also preferably produced at regular time intervals.

Figure 4:
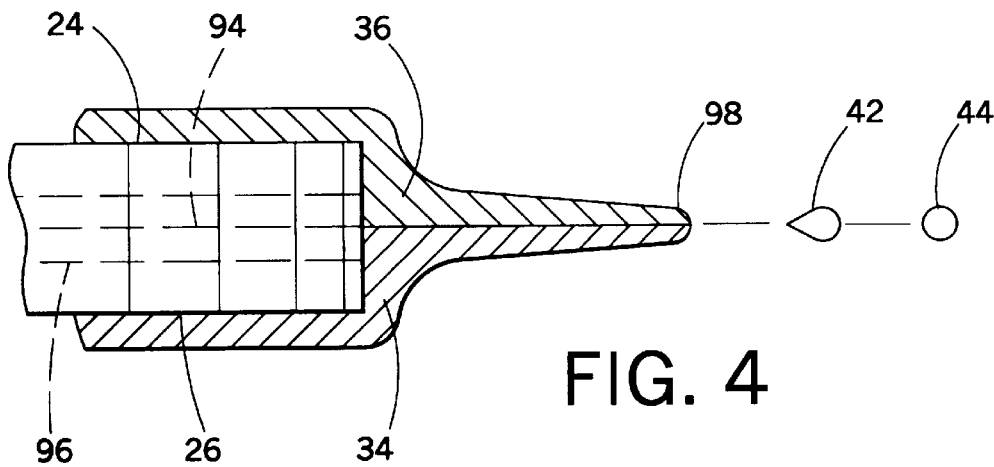
FIG. 4 illustrates an enlarged view of the bichromal reservoir of the apparatus shown in FIG. 1.

Referring again to FIG. 1, the electrical pulses are produced using an RF signal generator 82. The pulses are carried by a first electrical conductor 84, which is positioned within a cavity 86 of the spindle 32 and is electrically connected to a first piece 88 of a rotatable connector. A second piece 92 of the rotatable connector is located within the disc 28. A second electrical conductor 94 is electrically connected to the second piece 92 of the rotatable connector within the disc 28 and extends through a cavity 96 of the disc 28. The first electrical conductor 84 and the first piece 88 of the rotatable connector are electrically insulated from the spindle 32. Similarly, the second electrical conductor 94 and the second piece 92 of the rotatable connector are electrically insulated from the disc 28. The second electrical conductor 94 extends to the tip 98 of the bichromal reservoir 36 (see FIG. 4).

It is preferable that the carrier fluid forming the ligament 70 be either an electrical conductor or a lossy dielectric (e.g., alcohol is slightly conductive). Less conductive carrier fluids which are made more conductive by adding ionic species are also contemplated. Under these circumstances, the ligament is considered to be a resistive device. As shown in the following equation, the resistance per unit length depends on the axial position through the ligament:

$$\frac{\partial R}{\partial z} = \frac{1}{\sigma \pi h^2(z)} \quad (4)$$

where $\sigma$ is the electrical conductivity, and h(z) is the half-thickness of the ligament as a function of the axial position, z (see FIG. 3). From Equation 4, it is seen that the resistance along the ligament 70 is highest in the neck 76.

The leading edge 110 of the first glob 72 has some small but finite amount of capacitance. This capacitance is approximated as that of a sphere having radius a. Using this approximation, the capacitance of the leading edge 110 of the first glob 72 is calculated as:

$$C = 4\pi\epsilon_0 a \quad (5)$$

where C is the capacitance with respect to a ground surface located at an infinite distance. Since the first glob 72 is approximately 80 $\mu$m, the capacitance, C, is calculated to be 0.00445 pf.

Figure 5:
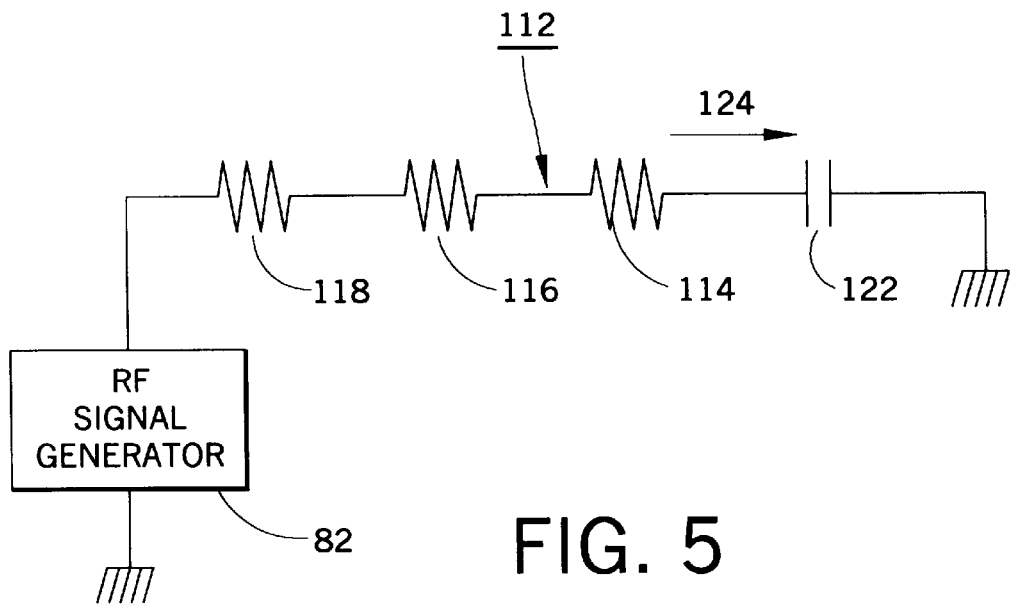
FIG. 5 illustrates an equivalent electrical circuit for the ligament shown in FIG. 3.

FIG. 5 illustrates an equivalent electrical circuit 112 for the ligament 70 illustrated in FIG. 3. Three resistors 114, 116, 118 in series illustrate the equivalent resistances along the axis of the ligament. The first resistor 114 corresponds to the resistance of the first glob 72. The second resistor 116 corresponds to the resistance of the neck 76. The third resistor 118 corresponds to the resistance of the second glob 74. The leading edge of the first glob 72 is represented by a capacitor 122. Current 124 flows through the circuit 112 when it is driven by the RF signal generator 82. Because the circuit is illustrated as having elements connected in series, the current 124 throughout the circuit 112 is constant. However, the power dissipated in the various components 114, 116, 118 is different. The variable power along the circuit 112 enhances the instability of the ligament 70.

Joule heating is used to produce heat in the neck 76 for boiling the neck 76 away and thus separating the first glob 72 from the second glob 74. The Joule heating is achieved by choosing appropriate values for conductivity, applied voltage, and frequency. In this manner, substantially equivalent balls are produced by repeatedly applying RF pulses at regular intervals.

Figure 6:
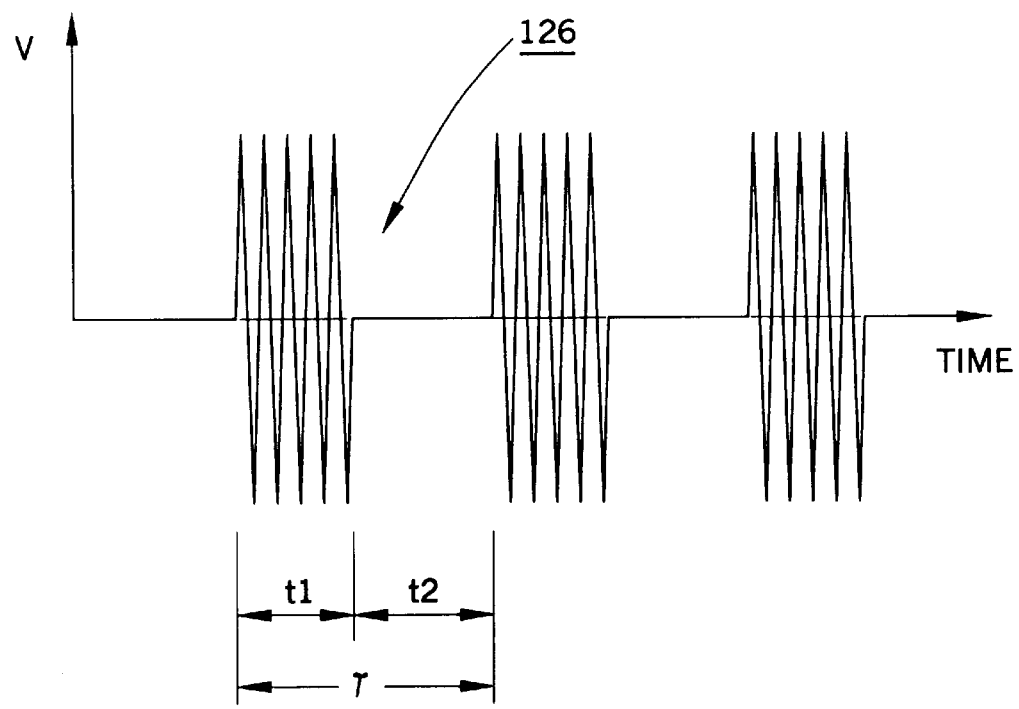
FIG. 6 illustrates a timing chart for a sequence of electrical pulses used to break-apart the globs shown in FIG. 3.

FIG. 6 illustrates a chart 126 of the voltage produced at the tip 98 of the bichromal reservoir 36 versus time. RF energy is supplied during time t1, which produces the voltage at the tip 98. This energy is converted into heat, primarily in the neck. No RF energy is supplied during time t2, during which time the next end glob forms.

As discussed above, the capacitance at the end of the glob is very small. Consequently, not much current flows in the ligament unless the operating frequency and voltage are sufficiently high. For a given voltage, the low frequency impedance and, hence, current, is primarily determined by the capacitance. At higher frequencies, the current is determined primarily by the resistance. Furthermore, the resistance changes as the instability of the ligament and the vaporization of the neck proceed. However, the energy dissipated in the neck increases over time as a greater fraction of the total voltage appears across a smaller portion of the neck. Therefore, the field strength in the neck and the amount of Joule heating increases.

For a ligament having a sufficiently low value of electrical conductivity a, the resistance is also limited. Such a case is particularly simple to analyze. In this situation, the rate at which the temperature in the neck rises is given by the equation:

$$\frac{dT}{dt} = \frac{\sigma}{C_p} \frac{V^2}{4} \left( \frac{h_{max}^2}{h_0 L} \right) \quad (6)$$

where $C_p$ is the specific heat of the liquid, and T is the temperature of the liquid.

For example, using the nomenclature of FIG. 3, with $h_0=10$ μm, $h_{max}=40$ μm, and the length of the glob neck l=200 μm, V=3 kv, $C_p=1.9*10^6$ Ks$^{-1}$, and σ=0.20 Ω$^{-1}$m$^{-1}$, Equation 6 yields:

$$\frac{dT}{dt} = 9*10^6 Ks^{-1} \quad (7)$$

The result shown in Equation 7 approximately represents the situation for an alcohol which has had its conductivity suitably increased. However, the calculated value is still much lower than what would result for sea water. The rate of rise for temperature in Equation 7 is sufficient to actually bring the alcohol to a boil in a few microseconds. However, vaporization takes more energy and, hence, more time. For n-butyl alcohol, vaporization is accomplished in a few tens of microseconds. Thus, in this situation, the time t1 shown in FIG. 6 is approximately 25 μs, while the total time, t1+t2 (i.e., τ), is approximately 100 μs for droplets having diameters of approximately 80 μm.

Since the rate of change for the temperature of the carrier fluid is known, the frequency at which the RF pulse is applied must be determined. For the parameters used in the above example, the 3 db "corner" frequency is about 2 MHz. Consequently, operating the pulse at 10 MHz is preferable. It is understood that various methods are available for generating the necessary high voltage signal at this frequency. It is to be understood that other frequencies are also contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for fabricating bichromal balls, comprising:

means for fabricating droplets from electrically conductive hardenable liquids having different colors and flowing along the fabricating means, a forward end of the droplets forming ligaments from the hardenable liquids, the ligaments being unstable at an edge region of the fabricating means and breaking up into the droplets, each droplet including hemispheres of different colors;

an RF signal generator for producing electrical pulses at the edge region of the means for fabricating the droplets, for increasing the instability of a distal end of the ligaments, a capacitance in the conductive liquids causing current to flow from the signal generator to the hardenable liquids, thereby increasing the instability by producing Joule heat in at least a part of the ligament;

means for heating the droplets for reducing a diameter of the droplets and forming substantially spherical balls, each of the balls comprising hemispheres of different colors; and means for collecting the bichromal balls.

2. The apparatus for fabricating bichromal balls according to claim 1, wherein the RF signal generator causes the ligaments to form a front glob, a neck behind the front glob, and a back glob behind the neck, the neck being narrower than the front glob and the back glob being wider than the neck, the front glob and a part of the neck eventually forming the droplet.

3. The apparatus for fabricating bichromal balls according to claim 2, wherein the electrical pulses produce the Joule heat in the hardenable liquids for increasing the instability of the distal end of the ligaments.

4. The apparatus for fabricating bichromal balls according to claim 3, wherein the Joule heat produced by the RF generator boils away at least a part of the neck.

5. The apparatus for fabricating bichromal balls according to claim 3, wherein the RF signal generator produces the electrical pulses at regular time intervals, the droplets being fabricated at the regular time intervals such that the neck associated with each of the droplets is exposed to the electrical pulses during one of the respective regular time intervals.

6. An apparatus for fabricating bichromal balls from a slurry, having a first part and a second part and including a polymer capable of forming a hardenable material and an electrically conductive carrier fluid, a first colored pigment added to the first part of the slurry and a second colored pigment added to the second part of the slurry, the slurry being less viscous than the polymer, comprising:

a spindle;

a separator member attached to the spindle through a rotatable connector, the separator member having a first surface and a second surface located opposite the first surface and an edge region in contact with both the first and second surfaces;

means for flowing the first and second parts of the slurry over the first and second surfaces, respectively, toward the edge region so that the first and second parts of the slurry arrive at the edge at substantially the same flow rate and form a reservoir of the parts of the slurry outboard of the edge region, the reservoir including side-by-side regions of the first and second parts of the slurry;

means for propelling the first and second parts of the slurry from a forward tip of the reservoir as a plurality of ligaments having side-by-side portions of different colors, a forward end of the ligaments being unstable and breaking up into droplets, each droplet including hemispheres of differently colored slurries;

an RF signal generator for producing electrical pulses at the tip of the edge region, the pulses enhancing the break-up of the ligament into the droplets by increasing the instability of the forward end of the ligament, a capacitance in the electrically conductive carrier fluid causing current from the electrical pulses to flow from the signal generator through the tip of the edge region and to the carrier fluid, thereby increasing the instability by producing Joule heat in at least a part of the ligament;

means for removing the carrier fluid from the droplets via heat to form substantially spherical balls, each of the balls comprising hemispheres of different colors and having a diameter less than a diameter of the droplet from which it is formed; and means for collecting the bichromal balls.

7. The apparatus for fabricating bichromal balls according to claim 6, further comprising:

a first electrical conductor for carrying the pulses from the RF signal generator, through the spindle and to the rotatable connector, the first electrical conductor being electrically insulated from the spindle; and a second electrical conductor for carrying the pulses from the rotatable connector, through the separator member, and to the tip, of the, edge region, the second electrical conductor being electrically insulated from the separator member.

8. The apparatus for fabricating bichromal balls according to claim 6, wherein:

the means for propelling forms the ligaments to include a narrow portion behind the forward end and a wide portion behind the narrow portion; and the RF signal generator-produces an RF signal for producing the Joule heat for boiling-away at least a part of the narrow portion.

9. The apparatus for fabricating bichromal balls according to claim 8, wherein the RF signal generator produces the electrical signals at regular time intervals after the forward ends of the ligaments are dispensed from the tip of the edge region, the streams forming subsequent ligaments having a forward end, followed by a narrow portion and a wide portion, the subsequent ligaments being formed approximately at the regular time intervals, and each narrow portion being present at the tip of the edge region when the RF signal produces the heat.

10. A method for fabricating bichromal balls, comprising:

spinning a separator member on a spindle;

flowing first and second slurries over opposite surfaces of the separator member and toward an edge thereof so that the slurries arrive at the edge at substantially the same flow rate, the first and second slurries having different colors and being electrically conductive;

forming a reservoir of the first and second slurries outboard of the edge, the reservoir including side-by-side regions of the first and second slurries;

propelling the first and second slurries out of the reservoir as a plurality of ligaments having side-by-side portions of different colors;

generating an electrical pulse at a tip of the reservoir at the edge region for facilitating the forward end of each ligament to become unstable and to break-up into a droplet, a capacitance in the ligament created by the electrically conductive slurries causing a current to flow at the tip, thereby increasing the instability by producing Joule heat in at least a part of the ligament; and removing fluid from the droplet via heat and forming a substantially spherical ball having hemispheres of different colors and a diameter less than a diameter of the droplet.

11. The method for fabricating bichromal balls according to claim 10 wherein:

the propelling step includes:
    forming the forward end of the streams into a first glob, the first glob extending past the tip of the reservoir;
    forming the streams behind the first glob into a neck, the neck being narrower than the first glob and being located approximately at the tip of the reservoir; and
    forming the streams behind the neck into a second glob, the second glob being wider than the neck and approximately the same size as the first glob, the first glob, the neck and the second glob being formed at regular time intervals; and the generating step includes:
    generating the electrical pulse at the tip of the reservoir at the regular time intervals and when the neck is at the tip of the reservoir.

12. The method for fabricating bichromal balls according to claim 11, the generating step including:

producing the electrical pulse in an RF signal generator; and passing the electrical pulse from the RF signal generator, through the spindle and the separator member to the tip of the reservoir.

13. The method for fabricating bichromal balls according to claim 12, wherein:

the generating step includes:
    producing the Joule heat at the tip of the reservoir for boiling away the neck; and the method further includes the step:
    collecting the bichromal-balls.

14. The apparatus for fabricating bichromal balls according to claim 1, wherein the means for fabricating includes a disc.

15. The apparatus for fabricating bichromal balls according to claim 14, including means wherein the disc spins, thereby causing the forward end of the ligaments to be unstable at the edge region of the disc from centrifugal force.

16. The apparatus for fabricating bichromal balls according to claim 1, further including:

at least one electrical conductor for transmitting the electrical pulses from the RF signal generator to the edge region of the disc.

17. The apparatus for fabricating bichromal balls according to claim 6, wherein:

the separator member includes a circular plate;, the means for propelling includes centrifugal force created from spinning the circular plate.

18. The apparatus for fabricating bichromal balls according to claim 6, wherein the means for removing supplies enough of the heat to boil away the carrier fluid.

19. The method for fabricating bichromal balls according to claim 13 wherein the removing step includes:

applying the heat to boil-away the fluid.

* * * * *